United States Patent
Lee et al.

(10) Patent No.: US 10,470,001 B2
(45) Date of Patent: Nov. 5, 2019

(54) METHOD AND APPARATUS FOR SCHEDULING DATA COMMON TO BOTH MBSFN AND SC-PTM IN WIRELESS COMMUNICATION SYSTEM

(71) Applicant: LG ELECTRONICS INC., Seoul (KR)

(72) Inventors: Youngdae Lee, Seoul (KR); Sangwon Kim, Seoul (KR); Jaewook Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/460,784

(22) Filed: Mar. 16, 2017

(65) Prior Publication Data

US 2017/0273057 A1    Sep. 21, 2017

Related U.S. Application Data

(60) Provisional application No. 62/309,926, filed on Mar. 17, 2016, provisional application No. 62/317,464, filed on Apr. 1, 2016.

(51) Int. Cl.
*H04W 4/06*       (2009.01)
*H04W 72/12*     (2009.01)
*H04W 72/00*     (2009.01)

(52) U.S. Cl.
CPC ......... *H04W 4/06* (2013.01); *H04W 72/1289* (2013.01); *H04W 72/005* (2013.01)

(58) Field of Classification Search
CPC ....... H04W 72/042; H04W 4/06; H04W 8/06; H04W 72/1289; H04W 72/04; H04W 40/24; H04W 72/12; H04W 4/50; H04W 76/02; H04W 76/14; H04W 72/048; H04W 72/0446; H04W 40/246; H04W 76/023; H04W 72/1205; H04W 72/005; H04W 72/1278; H04W 4/44; H04W 80/10; H04L 67/12; H04L 29/08; H04L 29/06; H04L 65/4076; H04L 27/26; H04L 27/2601;

(Continued)

(56) References Cited

U.S. PATENT DOCUMENTS

2010/0315987 A1* 12/2010 Kuo ................. H04W 72/005
                                                            370/312
2013/0016688 A1*  1/2013 Han ................. H04L 1/1812
                                                            370/329

(Continued)

FOREIGN PATENT DOCUMENTS

CN          107135485 A  *  9/2017  ............ H04W 76/10

*Primary Examiner* — Hardikkumar D Patel
(74) *Attorney, Agent, or Firm* — Birch, Stewart, Kolasch & Birch, LLP

(57) ABSTRACT

In an embodiment, a user equipment (UE) receives common scheduling information which schedules the data across multiple multicast-broadcast single-frequency network (MBSFN) areas, and receives the data according to the common scheduling information. In another embodiment, the UE receives common scheduling information which schedules the data on either a physical multicast channel (PMCH) or a physical downlink shared channel (PDSCH), and receives the data on a corresponding channel according to the common scheduling information. The data may correspond to a vehicle-to-everything (V2X) message.

11 Claims, 9 Drawing Sheets

Transmission in the 1st subframe

Transmission in the 2nd subframe

(58) Field of Classification Search
CPC ......... H04L 67/16; H04L 63/00; H04H 40/90; H04H 20/71; G08G 1/0967; B60R 1/00; H04N 7/18; H04N 7/183
See application file for complete search history.

(56) References Cited

U.S. PATENT DOCUMENTS

| | | | | |
|---|---|---|---|---|
| 2015/0312726 | A1* | 10/2015 | Song | H04W 4/06 |
| | | | | 370/329 |
| 2017/0132923 | A1* | 5/2017 | Li | G08G 1/0112 |
| 2018/0027578 | A1* | 1/2018 | Xu | H04L 1/00 |
| | | | | 370/336 |
| 2018/0324559 | A1* | 11/2018 | Byun | H04W 80/10 |

\* cited by examiner

Transmission in the 2nd subframe

Transmission in the 1st subframe

METHOD AND APPARATUS FOR SCHEDULING DATA COMMON TO BOTH MBSFN AND SC-PTM IN WIRELESS COMMUNICATION SYSTEM

CROSS-REFERENCE TO RELATED APPLICATIONS

Pursuant to 35 U.S.C. § 119 (e), this application claims the benefit of U.S. Provisional Application Nos. 62/309,926, filed on Mar. 17, 2016, and 62/317,464, filed on Apr. 1, 2016, the contents of which are all hereby incorporated by reference herein in their entirety.

BACKGROUND OF THE INVENTION

Field of the Invention

The present invention relates to wireless communications, and more particularly, to a method and apparatus for scheduling data common to both multicast-broadcast single-frequency network (MBSFN) transmission and single-cell point-to-multipoint (SC-PTM) transmission in a wireless communication system.

Related Art

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

LTE-based vehicle-to-everything (V2X) is urgently desired from market requirement as widely deployed LTE-based network provides the opportunity for the vehicle industry to realize the concept of 'connected cars'. The market for vehicle-to-vehicle (V2V) communication in particular is time sensitive because related activities such as research projects, field test, and regulatory work are already ongoing or expected to start in some countries or regions such as US, Europe, Japan, Korea, and China.

3GPP is actively conducting study and specification work on LTE-based V2X in order to respond to this situation. In LTE-based V2X, PC5-based V2V has been given highest priority. It is feasible to support V2V services based on LTE PC5 interface with necessary enhancements such as LTE sidelink resource allocation, physical layer structure, and synchronization. In the meantime, V2V operation scenarios based on not only LTE PC5 interface but also LTE Uu interface or a combination of Uu and PC5 has been considered. The maximum efficiency of V2V services may be achieved by selecting/switching the operation scenario properly.

Early completion of the corresponding radio access network (RAN) specification for PC5-based V2V and integration with Uu interface will enable fast preparation for device and network implementation, thereby allowing more chance for LTE-based V2V in the market. In addition, it can provide the basis for other V2X services, especially vehicle-to-infrastructure/network (V2I/N) and vehicle-to-pedestrian (V2P) services, so that RAN support for all the V2X services can be completed in time.

SUMMARY OF THE INVENTION

The present invention provides a method and apparatus for scheduling data common to both multicast-broadcast single-frequency network (MBSFN) transmission and single-cell point-to-multipoint (SC-PTM) transmission in a wireless communication system. The present invention further provides a method and apparatus for scheduling data common to multiple MBSFN areas.

In an aspect, a method for receiving data, by a user equipment (UE), in a wireless communication system is provided. The method includes receiving common scheduling information which schedules the data across multiple multicast-broadcast single-frequency network (MBSFN) areas, and receiving the data according to the common scheduling information.

In another aspect, a method for receiving data, by a user equipment (UE), in a wireless communication system is provided. The method includes receiving common scheduling information which schedules the data on either a physical multicast channel (PMCH) or a physical downlink shared channel (PDSCH), and receiving the data on a corresponding channel according to the common scheduling information.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

For clarity, the following description will focus on the LTE-A. However, technical features of the present invention are not limited thereto.

Figure 1:
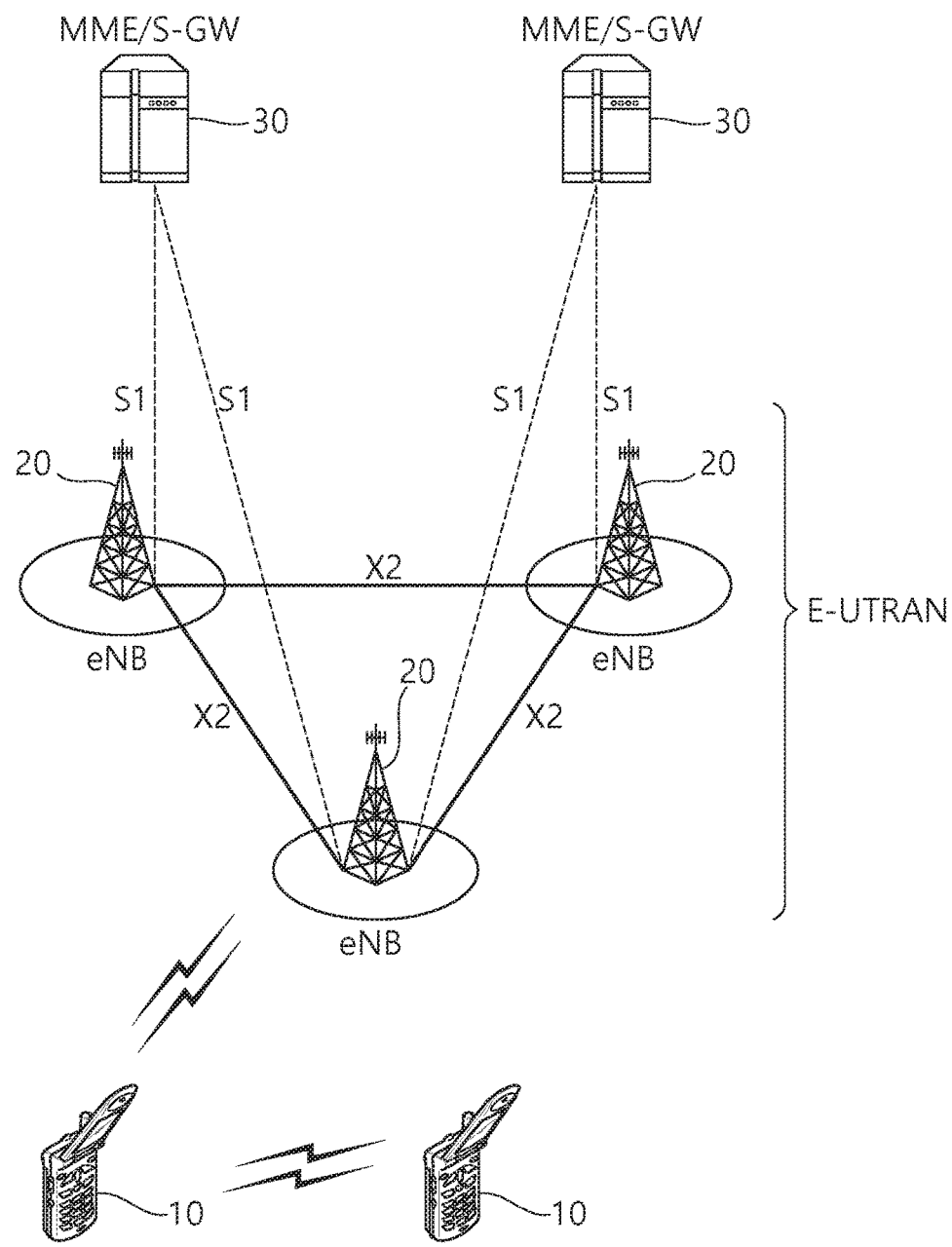
FIG. 1 shows LTE system architecture.

FIG. 1 shows LTE system architecture. Referring to FIG. 1, the LTE system architecture includes one or more user equipment (UE; 10), an evolved-UMTS terrestrial radio access network (E-UTRAN) and an evolved packet core (EPC). The UE 10 refers to a communication equipment carried by a user. The UE 10 may be fixed or mobile, and may be referred to as another terminology, such as a mobile station (MS), a user terminal (UT), a subscriber station (SS), a wireless device, etc.

The E-UTRAN includes one or more evolved node-B (eNB) 20, and a plurality of UEs may be located in one cell. The eNB 20 provides an end point of a control plane and a user plane to the UE 10. The eNB 20 is generally a fixed station that communicates with the UE 10 and may be referred to as another terminology, such as a base station (BS), an access point, etc. One eNB 20 may be deployed per cell.

Hereinafter, a downlink (DL) denotes communication from the eNB 20 to the UE 10. An uplink (UL) denotes communication from the UE 10 to the eNB 20. A sidelink (SL) denotes communication between the UEs 10. In the DL, a transmitter may be a part of the eNB 20, and a receiver may be a part of the UE 10. In the UL, the transmitter may be a part of the UE 10, and the receiver may be a part of the eNB 20. In the SL, the transmitter and receiver may be a part of the UE 10.

The EPC includes a mobility management entity (MME) and a serving gateway (S-GW). The MME/S-GW 30 provides an end point of session and mobility management function for the UE 10. For convenience, MME/S-GW 30 will be referred to herein simply as a "gateway," but it is understood that this entity includes both the MME and S-GW. A packet data network (PDN) gateway (P-GW) may be connected to an external network.

The MME provides various functions including non-access stratum (NAS) signaling to eNBs 20, NAS signaling security, access stratum (AS) security control, inter core network (CN) node signaling for mobility between 3GPP access networks, idle mode UE reachability (including control and execution of paging retransmission), tracking area list management (for UE in idle and active mode), packet data network (PDN) gateway (P-GW) and S-GW selection, MME selection for handovers with MME change, serving GPRS support node (SGSN) selection for handovers to 2G or 3G 3GPP access networks, roaming, authentication, bearer management functions including dedicated bearer establishment, support for public warning system (PWS) (which includes earthquake and tsunami warning system (ETWS) and commercial mobile alert system (CMAS)) message transmission. The S-GW host provides assorted functions including per-user based packet filtering (by e.g., deep packet inspection), lawful interception, UE Internet protocol (IP) address allocation, transport level packet marking in the DL, UL and DL service level charging, gating and rate enforcement, DL rate enforcement based on access point name aggregate maximum bit rate (APN-AMBR).

Interfaces for transmitting user traffic or control traffic may be used. The UE 10 is connected to the eNB 20 via a Uu interface. The UEs 10 are connected to each other via a PC5 interface. The eNBs 20 are connected to each other via an X2 interface. Neighboring eNBs may have a meshed network structure that has the X2 interface. The eNB 20 is connected to the gateway 30 via an S1 interface.

Figure 2:
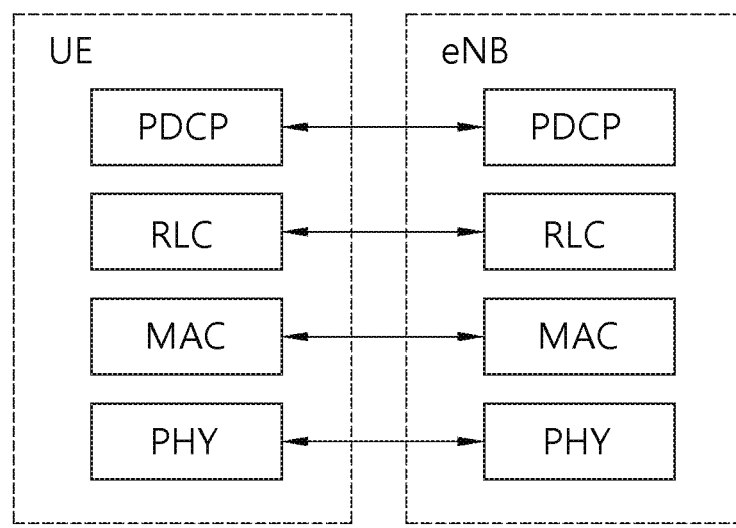
FIG. 2 shows a block diagram of a user plane protocol stack of an LTE system.
Figure 3:
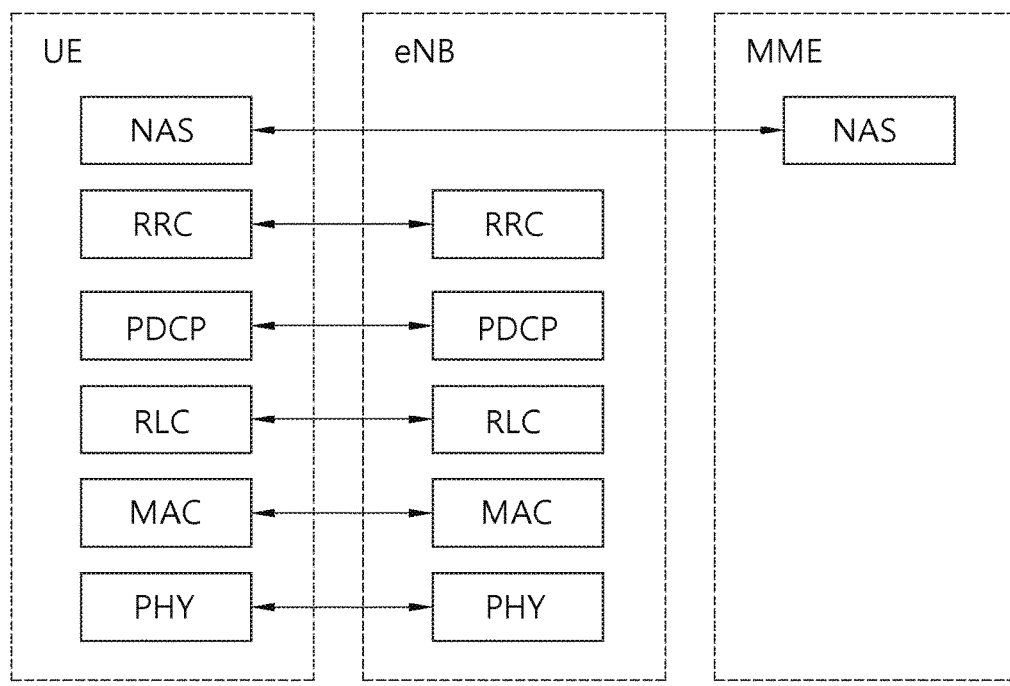
FIG. 3 shows a block diagram of a control plane protocol stack of an LTE system.

FIG. 2 shows a block diagram of a user plane protocol stack of an LTE system. FIG. 3 shows a block diagram of a control plane protocol stack of an LTE system. Layers of a radio interface protocol between the UE and the E-UTRAN may be classified into a first layer (L1), a second layer (L2), and a third layer (L3) based on the lower three layers of the open system interconnection (OSI) model that is well-known in the communication system.

A physical (PHY) layer belongs to the L1. The PHY layer provides a higher layer with an information transfer service through a physical channel. The PHY layer is connected to a medium access control (MAC) layer, which is a higher layer of the PHY layer, through a transport channel. A physical channel is mapped to the transport channel. Data between the MAC layer and the PHY layer is transferred through the transport channel. Between different PHY layers, i.e., between a PHY layer of a transmission side and a PHY layer of a reception side, data is transferred via the physical channel.

A MAC layer, a radio link control (RLC) layer, and a packet data convergence protocol (PDCP) layer belong to the L2. The MAC layer provides services to the RLC layer, which is a higher layer of the MAC layer, via a logical channel. The MAC layer provides data transfer services on logical channels. The RLC layer supports the transmission of data with reliability. Meanwhile, a function of the RLC layer may be implemented with a functional block inside the MAC layer. In this case, the RLC layer may not exist. The PDCP layer provides a function of header compression function that reduces unnecessary control information such that data being transmitted by employing IP packets, such as IPv4 or Ipv6, can be efficiently transmitted over a radio interface that has a relatively small bandwidth.

A radio resource control (RRC) layer belongs to the L3. The RLC layer is located at the lowest portion of the L3, and is only defined in the control plane. The RRC layer controls logical channels, transport channels, and physical channels in relation to the configuration, reconfiguration, and release of radio bearers (RBs). The RB signifies a service provided the L2 for data transmission between the UE and E-UTRAN.

Referring to FIG. 2, the RLC and MAC layers (terminated in the eNB on the network side) may perform functions such as scheduling, automatic repeat request (ARQ), and hybrid ARQ (HARQ). The PDCP layer (terminated in the eNB on the network side) may perform the user plane functions such as header compression, integrity protection, and ciphering.

Referring to FIG. 3, the RLC and MAC layers (terminated in the eNB on the network side) may perform the same functions for the control plane. The RRC layer (terminated in the eNB on the network side) may perform functions such as broadcasting, paging, RRC connection management, RB control, mobility functions, and UE measurement reporting and controlling. The NAS control protocol (terminated in the MME of gateway on the network side) may perform functions such as a SAE bearer management, authentication, LTE_IDLE mobility handling, paging origination in LTE_IDLE, and security control for the signaling between the gateway and UE.

A physical channel transfers signaling and data between PHY layer of the UE and eNB with a radio resource. A physical channel consists of a plurality of subframes in time domain and a plurality of subcarriers in frequency domain. One subframe, which is 1 ms, consists of a plurality of symbols in the time domain. Specific symbol(s) of the subframe, such as the first symbol of the subframe, may be used for a physical downlink control channel (PDCCH). The PDCCH carries dynamic allocated resources, such as a physical resource block (PRB) and modulation and coding scheme (MCS).

A DL transport channel includes a broadcast channel (BCH) used for transmitting system information, a paging channel (PCH) used for paging a UE, a downlink shared channel (DL-SCH) used for transmitting user traffic or control signals, a multicast channel (MCH) used for multicast or broadcast service transmission. The DL-SCH supports HARQ, dynamic link adaptation by varying the modulation, coding and transmit power, and both dynamic and semi-static resource allocation. The DL-SCH also may enable broadcast in the entire cell and the use of beamforming.

A UL transport channel includes a random access channel (RACH) normally used for initial access to a cell, and an uplink shared channel (UL-SCH) for transmitting user traffic or control signals. The UL-SCH supports HARQ and dynamic link adaptation by varying the transmit power and potentially modulation and coding. The UL-SCH also may enable the use of beamforming.

The logical channels are classified into control channels for transferring control plane information and traffic channels for transferring user plane information, according to a type of transmitted information. That is, a set of logical channel types is defined for different data transfer services offered by the MAC layer.

The control channels are used for transfer of control plane information only. The control channels provided by the MAC layer include a broadcast control channel (BCCH), a paging control channel (PCCH), a common control channel (CCCH), a multicast control channel (MCCH) and a dedicated control channel (DCCH). The BCCH is a downlink channel for broadcasting system control information. The PCCH is a downlink channel that transfers paging information and is used when the network does not know the location cell of a UE. The CCCH is used by UEs having no RRC connection with the network. The MCCH is a point-to-multipoint downlink channel used for transmitting multimedia broadcast multicast services (MBMS) control information from the network to a UE. The DCCH is a point-to-point bi-directional channel used by UEs having an RRC connection that transmits dedicated control information between a UE and the network.

Traffic channels are used for the transfer of user plane information only. The traffic channels provided by the MAC layer include a dedicated traffic channel (DTCH) and a multicast traffic channel (MTCH). The DTCH is a point-to-point channel, dedicated to one UE for the transfer of user information and can exist in both UL and DL. The MTCH is a point-to-multipoint downlink channel for transmitting traffic data from the network to the UE.

UL connections between logical channels and transport channels include the DCCH that can be mapped to the UL-SCH, the DTCH that can be mapped to the UL-SCH and the CCCH that can be mapped to the UL-SCH. Downlink connections between logical channels and transport channels include the BCCH that can be mapped to the BCH or DL-SCH, the PCCH that can be mapped to the PCH, the DCCH that can be mapped to the DL-SCH, and the DTCH that can be mapped to the DL-SCH, the MCCH that can be mapped to the MCH, and the MTCH that can be mapped to the MCH.

An RRC state indicates whether an RRC layer of the UE is logically connected to an RRC layer of the E-UTRAN. The RRC state may be divided into two different states such as an RRC_idle state (RRC_IDLE) and an RRC connected state (RRC_CONNECTED). In RRC_IDLE, the UE may receive broadcasts of system information and paging information while the UE specifies a discontinuous reception (DRX) configured by NAS, and the UE has been allocated an identification (ID) which uniquely identifies the UE in a tracking area and may perform public land mobile network (PLMN) selection and cell re-selection. Also, in RRC_IDLE, no RRC context is stored in the eNB.

In RRC_CONNECTED, the UE has an E-UTRAN RRC connection and a context in the E-UTRAN, such that transmitting and/or receiving data to/from the eNB becomes possible. Also, the UE can report channel quality information and feedback information to the eNB. In RRC_CONNECTED, the E-UTRAN knows the cell to which the UE belongs. Therefore, the network can transmit and/or receive data to/from UE, the network can control mobility (handover and inter-radio access technologies (RAT) cell change order to GSM EDGE radio access network (GERAN) with network assisted cell change (NACC)) of the UE, and the network can perform cell measurements for a neighboring cell.

In RRC_IDLE, the UE specifies the paging DRX cycle. Specifically, the UE monitors a paging signal at a specific paging occasion of every UE specific paging DRX cycle. The paging occasion is a time interval during which a paging signal is transmitted. The UE has its own paging occasion. A paging message is transmitted over all cells belonging to the same tracking area. If the UE moves from one tracking area (TA) to another TA, the UE will send a tracking area update (TAU) message to the network to update its location.

Figure 4:
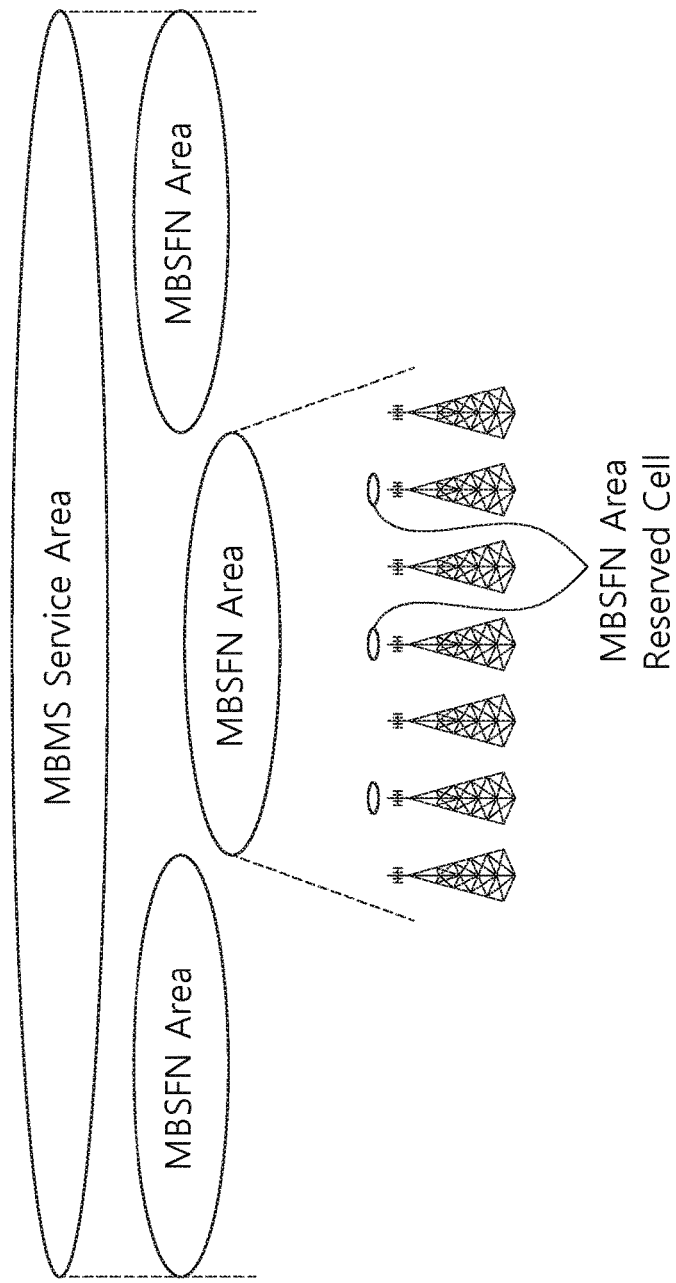
FIG. 4 shows MBMS definitions.

FIG. 4 shows MBMS definitions. For MBMS, the following definitions are introduced:

Multicast-broadcast single-frequency network (MBSFN) synchronization area: an area of the network where all eNBs can be synchronized and perform MBSFN transmissions. MBSFN synchronization areas are capable of supporting one or more MBSFN areas. On a given frequency layer, an eNB can only belong to one MBSFN synchronization area. MBSFN synchronization areas are independent from the definition of MBMS service areas MBSFN transmission or a transmission in MBSFN mode: a simulcast transmission technique realized by transmission of identical waveforms at the same time from multiple cells. An MBSFN transmission from multiple cells within the MBSFN area is seen as a single transmission by a UE.

MBSFN area: an MBSFN area consists of a group of cells within an MBSFN synchronization area of a network, which are coordinated to achieve an MBSFN transmission. Except for the MBSFN area reserved cells, all cells within an MBSFN Area contribute to the MBSFN Transmission and advertise its availability. The UE may only need to consider a subset of the MBSFN areas that are configured, i.e. when it knows which MBSFN area applies for the service(s) it is interested to receive.

MBSFN area reserved cell: A cell within a MBSFN area which does not contribute to the MBSFN transmission. The cell may be allowed to transmit for other services but at restricted power on the resource allocated for the MBSFN transmission.

Synchronization sequence: Each SYNC protocol data unit (PDU) contains a time stamp which indicates the start time of the synchronization sequence. For an MBMS service, each synchronization sequence has the same duration which is configured in the broadcast multicast service center (BM-SC) SC and the multi-cell/multicast coordination entity (MCE).

Synchronization Period: The synchronization period provides the time reference for the indication of the start time of each synchronization sequence. The time stamp which is provided in each SYNC PDU is a relative value which refers to the start time of the synchronization period. The duration of the synchronization period is configurable.

Transmission of a MBMS in E-UTRAN uses either MBSFN transmission or single-cell point-to-multipoint (SC-PTM) transmission. The MCE makes the decision on whether to use SC-PTM or MBSFN for each MBMS session.

Single-cell transmission of MBMS (i.e. SC-PTM transmission) is characterized by:

MBMS is transmitted in the coverage of a single cell;
One single-cell MCCH (SC-MCCH) and one or more single-cell MTCH(s) (SC-MTCH(s)) are mapped on DL-SCH;
Scheduling is done by the eNB;
SC-MCCH and SC-MTCH transmissions are each indicated by a logical channel specific radio network temporary identity (RNTI) on PDCCH (there is a one-to-one mapping between temporary mobile group identity (TMGI) and group RNTI (G-RNTI) used for the reception of the DL-SCH to which a SC-MTCH is mapped);
A single transmission is used for DL-SCH (i.e. neither blind HARQ repetitions nor RLC quick repeat) on which SC-MCCH or SC-MTCH is mapped.

Multi-cell transmission of MBMS (i.e. MBSFN transmission) is characterized by:

Synchronous transmission of MBMS within its MBSFN area;
Combining of MBMS transmission from multiple cells is supported;
Scheduling of each MCH is done by the MCE;
A single transmission is used for MCH (i.e. neither blind HARQ repetitions nor RLC quick repeat);
A single transport block (TB) is used per TTI for MCH transmission, that TB uses all the MBSFN resources in that subframe;
MTCH and MCCH can be multiplexed on the same MCH and are mapped on MCH for p-t-m transmission;
The MAC subheader indicates the logical channel identity (LCID) for MTCH and MCCH;
The MBSFN synchronization area, the MBSFN area, and the MBSFN cells are semi-statically configured e.g. by operation and maintenance (O&M);
MBSFN areas are static, unless changed by O&M (i.e. no dynamic change of areas).

Multiple MBMS services can be mapped to the same MCH and one MCH contains data belonging to only one MBSFN area. An MBSFN area contains one or more MCHs. An MCH specific MCS is used for all subframes of the MCH that do not use the MCS indicated in BCCH. All MCHs have the same coverage area.

Vehicle-to-everything (V2X) communication is described. V2X communication contains the three different types, i.e. vehicle-to-vehicle (V2V) communications, vehicle-to-infrastructure (V2I) communications, and vehicle-to-pedestrian (V2P) communications. These three types of V2X can use "co-operative awareness" to provide more intelligent services for end-users. This means that transport entities, such as vehicles, road side unit (RSU), and pedestrians, can collect knowledge of their local environment (e.g. information received from other vehicles or sensor equipment in proximity) to process and share that knowledge in order to provide more intelligent services, such as cooperative collision warning or autonomous driving.

V2X service is a type of communication service that involves a transmitting or receiving UE using V2V application via 3GPP transport. Based on the other party involved in the communication, it can be further divided into V2V service, V2I service, V2P service, and vehicle-to-network (V2N) service. V2V service is a type of V2X service, where both parties of the communication are UEs using V2V application. V2I service is a type of V2X service, where one party is a UE and the other party is an RSU both using V2I application. The RSU is an entity supporting V2I service that can transmit to, and receive from a UE using V2I application. RSU is implemented in an eNB or a stationary UE. V2P service is a type of V2X service, where both parties of the communication are UEs using V2P application. V2N service is a type of V2X service, where one party is a UE and the other party is a serving entity, both using V2N applications and communicating with each other via LTE network entities.

In V2V, E-UTRAN allows such UEs that are in proximity of each other to exchange V2V-related information using E-UTRA(N) when permission, authorization and proximity criteria are fulfilled. The proximity criteria can be configured by the mobile network operator (MNO). However, UEs supporting V2V service can exchange such information when served by or not served by E-UTRAN which supports V2X service. The UE supporting V2V applications transmits application layer information (e.g. about its location, dynamics, and attributes as part of the V2V service). The V2V payload must be flexible in order to accommodate different information contents, and the information can be transmitted periodically according to a configuration provided by the MNO. V2V is predominantly broadcast-based. V2V includes the exchange of V2V-related application information between distinct UEs directly and/or, due to the limited direct communication range of V2V, the exchange of V2V-related application information between distinct UEs via infrastructure supporting V2X Service, e.g., RSU, application server, etc.

In V2I, the UE supporting V2I applications sends application layer information to RSU. RSU sends application layer information to a group of UEs or a UE supporting V2I applications.

In V2P, E-UTRAN allows such UEs that are in proximity of each other to exchange V2P-related information using E-UTRAN when permission, authorization and proximity criteria are fulfilled. The proximity criteria can be configured by the MNO. However, UEs supporting V2P service can exchange such information even when not served by E-UTRAN which supports V2X service. The UE supporting V2P applications transmits application layer information. Such information can be broadcast by a vehicle with UE supporting V2X Service (e.g. warning to pedestrian), and/or by a pedestrian with UE supporting V2X Service (e.g. warning to vehicle). V2P includes the exchange of V2P-related application information between distinct UEs (one for vehicle and the other for pedestrian) directly and/or, due to the limited direct communication range of V2P, the exchange of V2P-related application information between distinct UEs via infrastructure supporting V2X service, e.g., RSU, application server, etc.

Generally, V2X communication may use MBMS, including MBSFN transmission and/or SC-PTM transmission. In order to use MBSFN transmission and/or SC-PTM transmission efficiently for V2X communication, the need and solutions (if needed) to reduce MBSFN latency, primarily targeting control plane, is being discussed. Accordingly, the latency of MBMS control plane procedure should be analyzed and potential enhancement of DL broadcast may be proposed according to the present invention.

First, MBMS control plane latency is analyzed.

Figure 5:
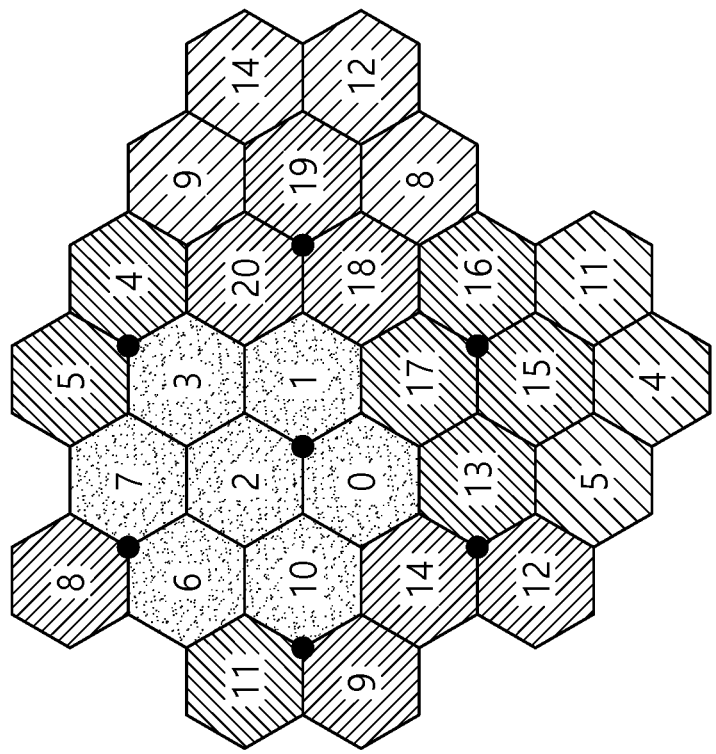
FIG. 5 shows an example of DL scheduling of MBSFN transmission for V2X communication.
Figure 5:
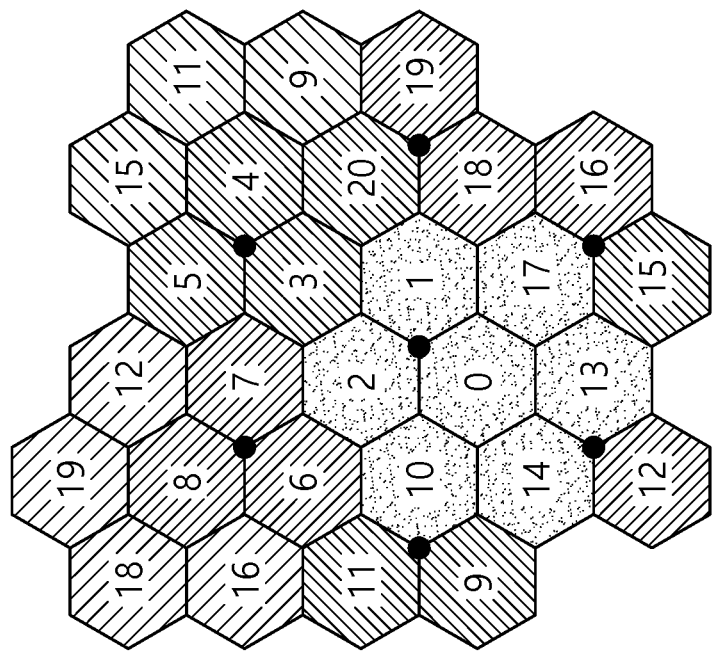

FIG. 5 shows an example of DL scheduling of MBSFN transmission for V2X communication. FIG. 5 shows DL scheduling for 7-site cell deployment. The cells of which hash is sparser in FIG. 5 (i.e. cells #9, #11, #12, #15, #16, #18, #19 in the left figure, and cells #4, #5, #8, #9, #11, #11, #12, #14 in the right figure) represent mirror image cells by the wrap-around structure. The seven cells in the same hash transmit the same set of messages which are received by the cell at the set of the same-hashed cells. So, referring to left figure of FIG. 5, 7 cells having the same hash in the first subframe (i.e. cells #0, #1, #2, #10, #14, #13, #17) transmit the V2V messages received by cell #0. In order to transmit the V2V message received by the other cells, the set of cells transmitting the same V2V messages may change in time in the next subframe. For example, referring to the right figure of FIG. 5, in the second subframe, cells #0, #1, #2, #3, #6, #7 may transmit the V2V message received by cell #2. This implies 7-fold increase in the effective load offered to DL transmissions, i.e. each cell needs to transmit the V2V messages received by its own cell as well as the messages received in the six neighboring cells. Considering MBMS transmission, a group of 7 cells may be considered as a MBSFN area where several cells are synchronized for DL broadcast. In FIG. 5, the group of 7 cells moves across different MBSFN subframe, which means that the MBSFN area is moving.

However, E-UTRAN currently does not support moving MBSFN area, so-called dynamic MBSFN area. From standard perspective, DL scheduling in FIG. 5 can be realized by mapping different MBSFN areas which of each consists of 7 cells to different MBSFN subframes. Thus, one MBSFN transmission in the 1st subframe and another MBSFN transmission in the 2nd subframe may correspond to different overlapped MBSFN areas, even though all the MBSFN areas will broadcast the same service.

Accordingly, if MBSFN transmission is used to support V2V service, the UE may need to monitor multiple MBSFN areas in parallel and process V2X messages from multiple MBSFN areas as a single service. Since the UE is moving as a vehicle, the UE will frequently encounter new MBSFN areas while driving on a road. But, every new MBSFN area may serve the same service, i.e. V2V service.

Considering DL scheduling of MBSFN transmission shown above in FIG. 5 for V2X communication, the latency of MBSFN control plane may be analyzed when the UE moves between different MBSFN areas.

Figure 6:
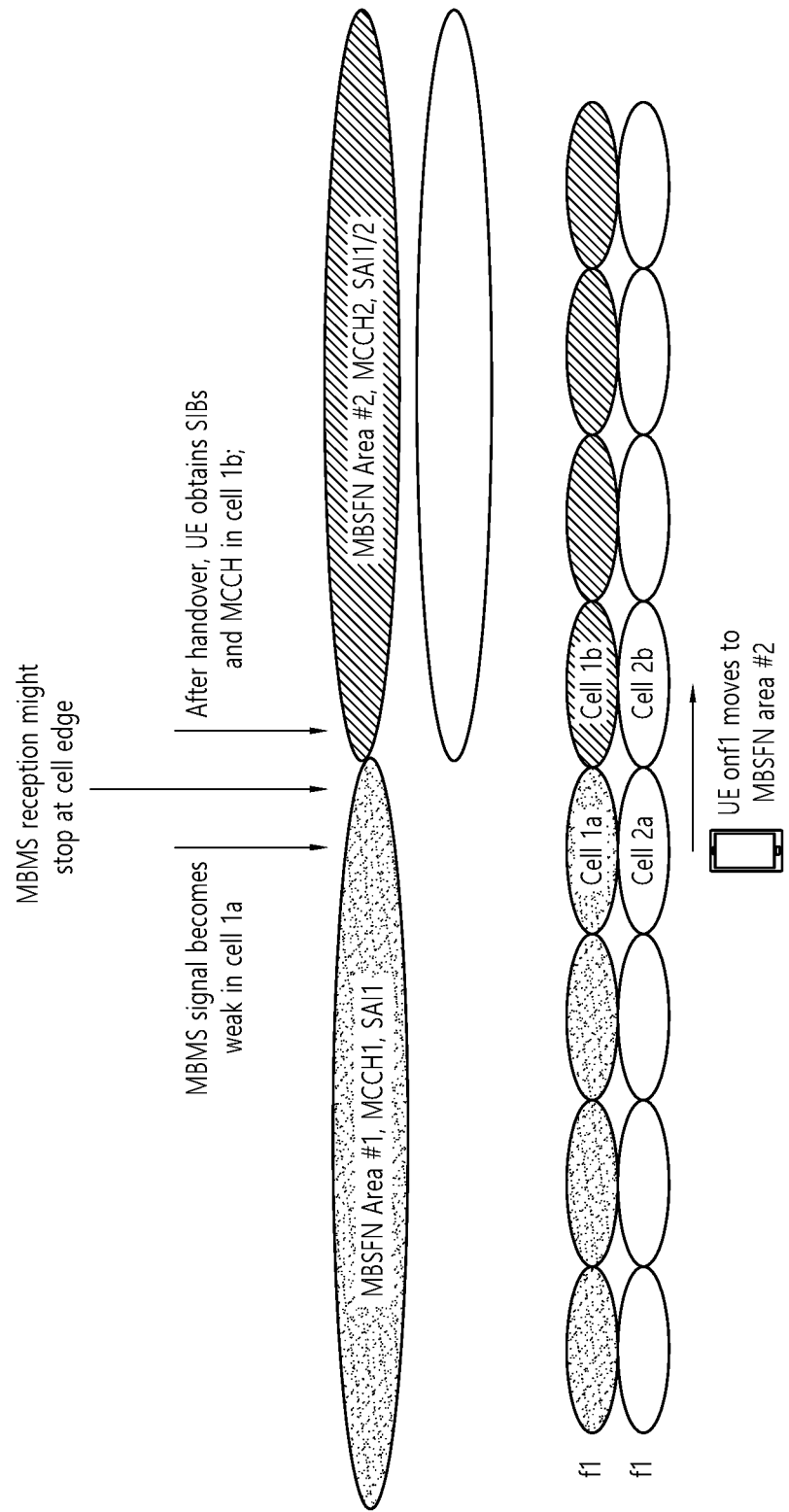
FIG. 6 shows an example of mobility between non-overlapping intra-frequency MBSFN areas.

FIG. 6 shows an example of mobility between non-overlapping intra-frequency MBSFN areas. Referring to FIG. 6, the UE receive the MBMS service at cell 1a on f1. Cell 1a lies in MBSFN area #1, which transmits MCCH1 and is part of SAI1. However, MBMS signal becomes weak in cell 1a, so the UE moves out of MBSFN area #1, where it has been receiving the MBMS service, into MBSFN area #2. The UE moves from cell 1a to cell 1b on f1. MBMS reception may stop at cell edge. MBSFN area #2 may also be part of SAI1 or SAI2, both belonging to the same MBMS service area. After successful cell change, the UE reads SIBs and MCCH2 in cell 1b. The UE may detect that the same MBMS service is provided or not in cell 1b. The UE may continue MBMS reception on f1.

The control plane delay for mobility between MBSFN areas shown in FIG. 6 may be estimated in Table 1 below, for the average and for the worst case (in bracket). The control plane delay in Table 1 does not include user plane delay. Thus, the sum of the control plane delay and the user plane delay for DL MBSFN will be the service interruption time that occurs due to MBSFN area change.

TABLE 1

| | Time (ms) | Comments |
|---|---|---|
| MIB/SIB1 reading delay | 30 | the acquisition of target cell MIB and SIB1 |
| SIB13 reading delay | 40 (80) | Assuming the scheduling periodicity of the SIB13 is 80 ms. |
| Acquisition of MCCH configuration from SIB13 | 10 | Processing delay at the UE |
| Delay due to MCCH scheduling period | 160 (320) | For MCCH Repetition period of 320 ms. |
| Acquisition of MCCH and MTCH configuration for TMGI | 10 | Processing delay at the UE |
| Time required if acquisition of multiple MCCHs is required. | 50 (100) | Maximum MCCH offset value is 100 ms. It is assumed that the reading of multiple MCCH is performed in parallel |
| Total time | 300 (530) | |

From Table 1, it can be known that the control plane delay of MB SFN area change cannot meet the latency requirement. The value of control plane delay is too far from the target in both average and worst case. Namely, whenever the UE enters new MBSFN area(s) (e.g. every several seconds) which may be overlapped or non-overlapped with old MBSFN area(s), the UE will fail to receive V2X messages within 300 ms to 530 ms (with additional user plane latency). MBSFN will broadcast a number of V2X messages within 300 ms to 530 ms. Considering that the MBSFN area size will be small for V2V service, this control plane latency problem needs to be seriously addressed.

Instead that the UE moves between different MBNSF areas, the UE may move between SC-PTM cells. For analyzing the latency of SC-PTM control plane, the UE needs to first acquire the SC-PTM configuration in the target cell, and then continue to receive the same service over SC-PTM in the target cell. Table 2 shows an estimated service interruption time for the average and for the worst case (in bracket). The UE may experience additional service interruption due to the possible data loss (up to one scheduling period) caused by the unsynchronized SC-PTM scheduling between source cell and target cell.

TABLE 2

| Component | Time (ms) | Comments |
|---|---|---|
| MIB/SIB1 reading delay | 30 | the acquisition of target cell MIB and SIB1 |
| SC-PTM SIB reading delay | 40 (80) | Assuming the scheduling periodicity of the SC-PTM SIB is 80 ms. |
| Acquisition of the SC-MCCH configuration for SC-MCCH reception | 10 | Processing delay at the UE |
| Delay due to SC-MCCH repetition period | 40 (80) | For SC-MCCH repetition period of 80 ms. |
| Acquisition of SC-MCCH info, e.g. TMGI to Group-RNTI mapping | 10 | Processing delay at the UE |
| Total time | 130 (210) | |

From Table 2, it can be knows that the control plane delay of SC-PTM cell change cannot meet the latency requirement. The value of control plane delay is far from the target in both average and worst case. Whenever the UE enters new SC-PTM cell, e.g. every a few seconds in highway, the UE will lose all V2X messages within 130 ms to 210 ms (+ additional SC-PTM user plane latency).

Based on analysis on the control plane latency of MBSFN transmission and/or SC-PTM transmission described above, the control plane latency of MBSFN transmission and/or SC-PTM transmission should be addressed. Accordingly, in order to solve the problem described above, the present invention, DL scheduling common to multiple MBSFN areas is proposed for V2X communication. Specifically, based on analysis on the control plane latency of MBSFN transmission described above, the UE should monitor multiple MBSFN areas in parallel, but process V2X messages from those MBSFN areas as a single service for DL broadcast of V2X messages. It may be time-consuming that the UE reads scheduling information per PMCH per MBSFN area. Thus, it is desirable that scheduling information common to multiple MBSFN areas is used for V2X service. Such common scheduling information across multiple MBNSF areas may additionally reduce power consumption from pedestrian UE perspective, i.e. for V2P and could further reduce signaling overhead.

Further, in order to solve the problem described above DL scheduling common to MBSFN transmission and SC-PTM transmission is proposed for V2X communication. Specifically, both MBSFN and SC-PTM are beneficial to support different strategies of DL broadcast in V2X communication. In overlapped areas, MBSFN and SC-PTM may simultaneously operate in different subframes under common MBMS architecture for efficient support of V2X communication. In this sense, it is interesting to consider common scheduling information not only across different MBSFN areas for a single V2X service but also across MBSFN transmission and SC-PTM transmission at overlapped areas. Accordingly, scheduling information common to MBSFN transmission and SC-PTM transmission may be used.

Common scheduling information described above may be realized by either MAC control element (CE) (similar to MCH scheduling information (MSI) in MBSFN) or PDCCH (similar to SC-PTM). It should be further discussed whether MAC CE or PDCCH is used to schedule V2X messages in different subframes for a set of MBSFN areas used for V2X and SC-PTM.

Figure 7:
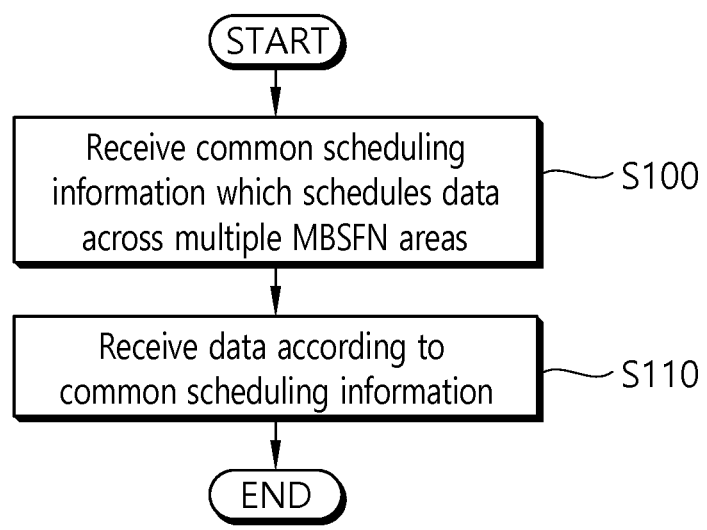
FIG. 7 shows a method for receiving data, by a UE, according to an embodiment of the present invention.

FIG. 7 shows a method for receiving data, by a UE, according to an embodiment of the present invention. The UE may move across the multiple MBSFN areas. The data may correspond to a V2X message.

In step S100, the UE receives common scheduling information which schedules the data across multiple multicast-broadcast single-frequency network (MBSFN) areas. The common scheduling information may be received via MAC CE or PDCCH. When the common scheduling information is received via MAC CE, the UE may decode the MAC CE. When the common scheduling information is received via PDCCH, the UE may monitor the PDCCH addressed by a specific RNTI, e.g. new RNTI. The common scheduling information may be received periodically. The common scheduling information may include MBMS SIBs and the MBSFNAreaConfiguration message for the multiple MBSFN areas.

In step S110, the UE receives the data according to the common scheduling information.

Figure 8:
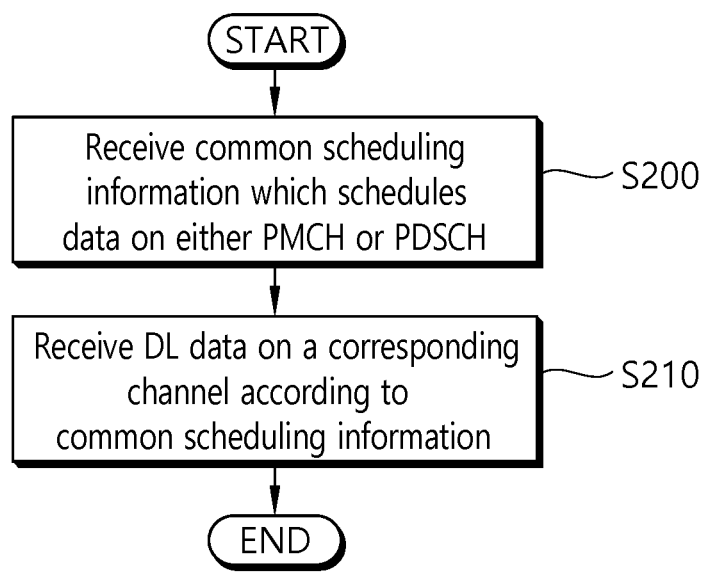
FIG. 8 shows a method for receiving data, by a UE, according to another embodiment of the present invention.

FIG. 8 shows a method for receiving data, by a UE, according to another embodiment of the present invention. The data may correspond to a V2X message.

In step S200, the UE receives common scheduling information which schedules the data on either a physical multicast channel (PMCH) or a physical downlink shared channel (PDSCH). The common scheduling information may be received via MAC CE or PDCCH. When the common scheduling information is received via MAC CE, the UE may decode the MAC CE. When the common scheduling information is received via PDCCH, the UE may monitor the PDCCH addressed by a specific RNTI, e.g. new RNTI. The common scheduling information may be received periodically. That is, the UE receives the common scheduling information via MAC CE or PDCCH indicating DL broadcast data on either PMCH transmission or PDSCH transmission e.g. for V2X service. The PMCH transmission may correspond to MBSFN transmission. The PDSCH transmission corresponds to SC-PTM transmission.

In step S210, the UE receives the data on a corresponding channel according to the common scheduling information. When the common scheduling information schedules the data on the PMCH, the UE decodes the PMCH, and receives the data on a MCH which is a transport channel mapped to the PMCH. That is, if the common scheduling information indicates PMCH transmission at a specific subframe, the UE decodes PMCH and receive MCH from the subframe. Alternatively, when the common scheduling information schedules the data on the PDSCH, the UE decodes the PDSCH, and receives the data on a DL-SCH which is a transport channel mapped to the PDSCH. That is, if the common scheduling information indicates PDSCH transmission at a specific subframe, the UE decodes PDSCH and receive DL-SCH from the subframe.

In addition, in order to reduce the control plane latency of MBSFN transmission, alternative approach may be proposed. Based on analysis on the control plane latency of MBSFN transmission described above, the source of control plane latency stems from the process of reading SIB and MCCH. MCCH is used to broadcast a MBSFNAreaConfiguration message which mainly indicates subframe scheduling of different PMCH channels and different services. Considering that V2X messages to be broadcast via MBSFN or SC-PTM more or less come from a single service, MCCH-less MBSFN operation can be introduced for V2X communication. In addition, SIB13 is used to broadcast MCCH configuration. If MCCH is not used for MBSFN in V2X communication, the UE may avoid reading SIB13 whenever changing MB SFN areas. Furthermore, DL broadcast of V2X messages for V2X communication will require configuration of a number of small MBSFN areas in the network. Since MCCH is configured per MBSFN area, V2X communication via MBSFN may cause signaling overhead due to management of a number of small MB SFN areas. If MCCH-less operation is introduced, signaling overhead caused by SIB/MCCH can be reduced. MCCH-less operation may also be beneficial for SC-PTM. Even though MCCH is not used, user service description (USD), NAS or UE dedicated RRC signaling may be used for control signaling.

Further, in order to avoid receiving SIB13/15 and MCCH whenever entering a MBSFN area for reducing SIB and (SC-)MCCH latency, MBMS SIB at the serving cell may broadcast neighboring MBMS SIB at neighboring cells. And the MBSFNAreaConfiguration message at a MBSFN area may broadcast the MBSFNAreaConfiguration messages at a neighboring MBSFN areas. Alternatively, the target cell may inform UEs about MBMS SIB and the MBSFNAreaConfiguration messages.

For reducing control plane latency of MB SFN transmission, reducing MSI latency may also be targeted. For this, a MSI period may be further reduced from 40 ms, e.g. to 10 ms. Thus, the MBSFN latency may be comparable to the SC-PTM latency. Alternatively, PDCCH addressed by a new RNTI may be defined to periodically schedule MTCH transmissions for all (MBSFN) areas related to V2X communication. In this case, a bitmap in the PDCCH may indicate which MBSFN subframes are scheduled for V2X communication in this MSI period.

Regarding reception of multiple DL carriers for multiple PLMNs, the UE may monitor MSI or PDCCH from multiple DL carriers. In this case, same or different TMGIs may be used across multiple PLMNs. Alternatively, the UE may monitor MSI or PDCCH from a single DL carrier. In this case, cross-carrier scheduling on PDCCH addressed by a new RNTI may be configured.

Figure 9:
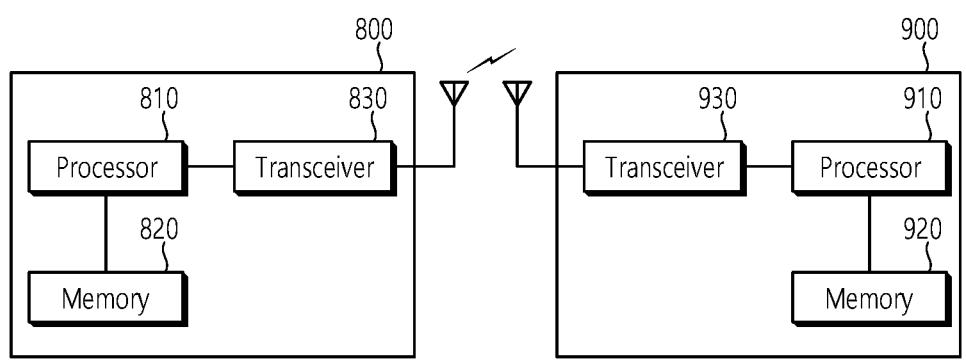
FIG. 9 shows a wireless communication system to implement an embodiment of the present invention.

FIG. 9 shows a wireless communication system to implement an embodiment of the present invention.

An eNB 800 includes a processor 810, a memory 820 and a transceiver 830. The processor 810 may be configured to implement proposed functions, procedures and/or methods described in this description. Layers of the radio interface protocol may be implemented in the processor 810. The memory 820 is operatively coupled with the processor 810 and stores a variety of information to operate the processor 810. The transceiver 830 is operatively coupled with the processor 810, and transmits and/or receives a radio signal.

A UE 900 includes a processor 910, a memory 920 and a transceiver 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The transceiver 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The transceivers 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

According to an embodiment of the present invention, latency of MBSFN transmission and/or SC-PTM transmission can be reduced, so V2X communication can be performed efficiently.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What is claimed is:

1. A method performed by a user equipment (UE) in a wireless communication system, the method comprising:
   receiving, by the UE, common scheduling information in a first area, wherein the common scheduling information informs that data for a vehicle-to-everything (V2X) service is scheduled on a physical multicast channel (PMCH) for multicast-broadcast single-frequency network (MBSFN) transmission at a first subframe and a second subframe, and wherein the common scheduling information informs that the data for the V2X service is scheduled on a physical downlink shared channel (PDSCH) for single-cell point-to-multipoint (SC-PTM) transmission at a third subframe;
   receiving, by the UE, the data for the V2X service in the first area at the first subframe based on the common scheduling information, wherein the first area is a MBSFN area; and
   after the UE enters to a second area, wherein the second area is an area overlapped by the first area and a third area, wherein the second area is an area in which both the MBSFN transmission and the SC-PTM transmission are supported, and the third area is an area in which the SC-PTM is supported;

receiving, by the UE, the data for the V2X service at the second subframe by the MBSFN transmission based on the common scheduling information; and receiving, by the UE, the data for the V2X service at the third subframe by the SC-PTM transmission based on the common scheduling information.

2. The method of claim 1, wherein the common scheduling information is received via a media access control (MAC) control element (CE).

3. The method of claim 2, further comprising decoding the MAC CE.

4. The method of claim 1, wherein the common scheduling information is received via a physical downlink control channel (PDCCH).

5. The method of claim 4, further comprising monitoring the PDCCH addressed by a specific radio temporary network identity (RNTI).

6. The method of claim 1, wherein the common scheduling information is received periodically.

7. The method of claim 1, wherein the common scheduling information includes multimedia broadcast multicast services (MBMS) system information blocks (SIBs) and a MBSFN area configuration message for multiple MBSFN areas.

8. The method of claim 1, wherein the receiving the data for the V2X service at the first subframe and the second subframe comprises:
   decoding the PMCH; and
   receiving the data for the V2X service on a multicast channel (MBCH), which is a transport channel mapped to the PMCH.

9. The method of claim 1, wherein the receiving the data for the V2X service at the third subframe comprises:
   decoding the PDSCH; and
   receiving the data for the V2X service on a downlink shared channel (DL-SCH), which is a transport channel mapped to the PDSCH.

10. The method of claim 1, wherein a multicast control channel (MCCH) is not monitored whenever the UE moves across multiple MBSFN areas.

11. A user equipment (UE) in a wireless communication system, the UE comprising:
   a memory;
   a transceiver; and
   a processor, operably coupled to the memory and the transceiver, that:
   controls the transceiver to receive common scheduling information in a first area, wherein the common scheduling information informs that data for a vehicle-to-everything (V2X) service is scheduled on a physical multicast channel (PMCH) for multicast-broadcast single-frequency network (MBSFN) transmission at a first subframe and a second subframe, and wherein the common scheduling information informs that the data for the V2X service is scheduled on a physical downlink shared channel (PDSCH) for single-cell point-to-multipoint (SC-PTM) transmission at a third subframe;
   controls the transceiver to receive the data in the first area at the first subframe based on the common scheduling information, wherein the first area is a MBSFN area; and
   after the UE enters to a second area, wherein the second area is an area overlapped by the first area and a third area, wherein the second area is an area in which both the MBSFN transmission and the SC-PTM transmission are supported, and the third area is an area in which the SC-PTM is supported;
   controls the transceiver to receive the data for the V2X service at the second subframe by the MBSFN transmission based on the common scheduling information; and
   controls the transceiver to receive the data for the V2X service at the third subframe by the SC-PTM transmission based on the common scheduling information.

* * * * *